UNITED STATES PATENT OFFICE.

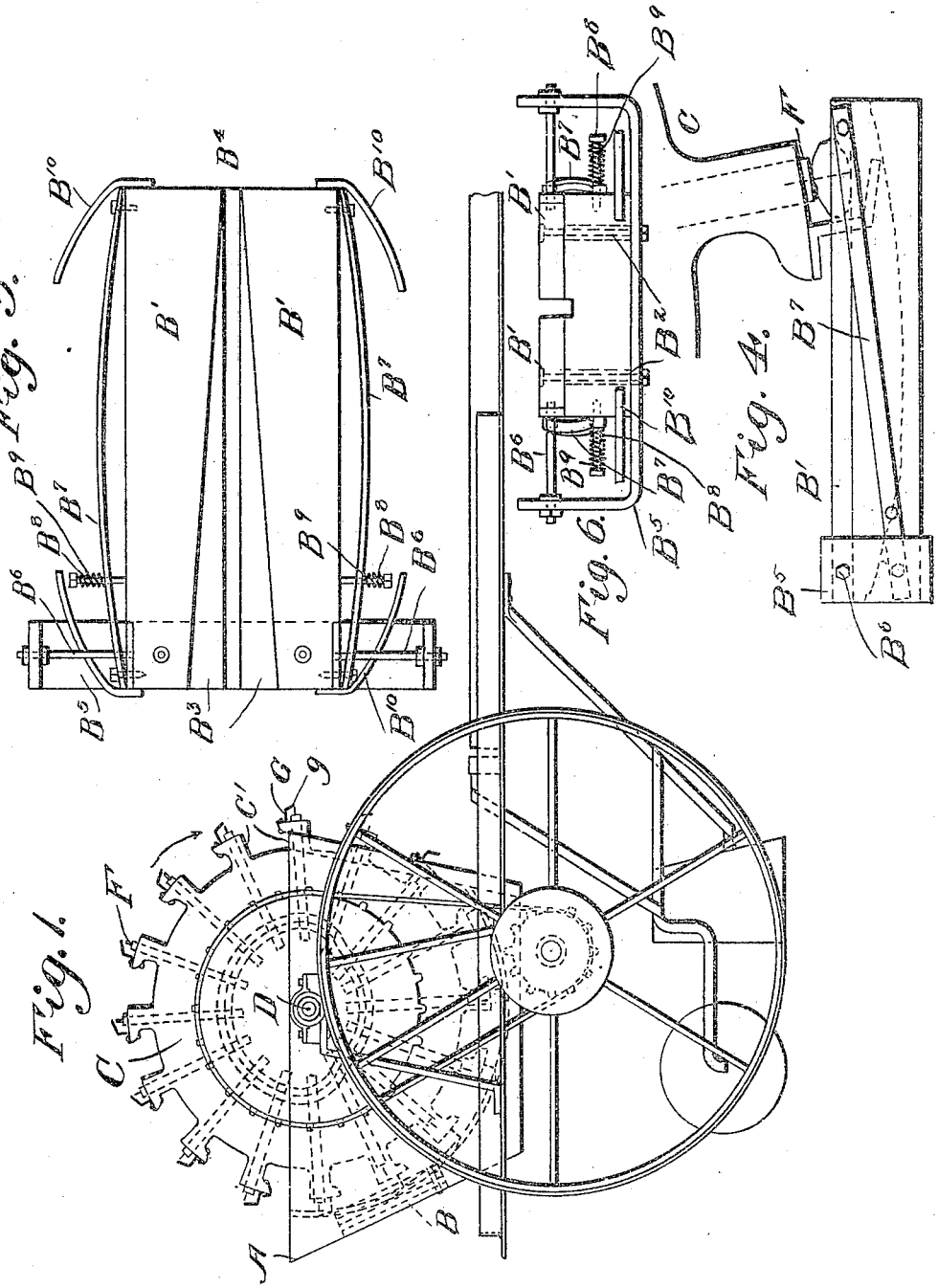

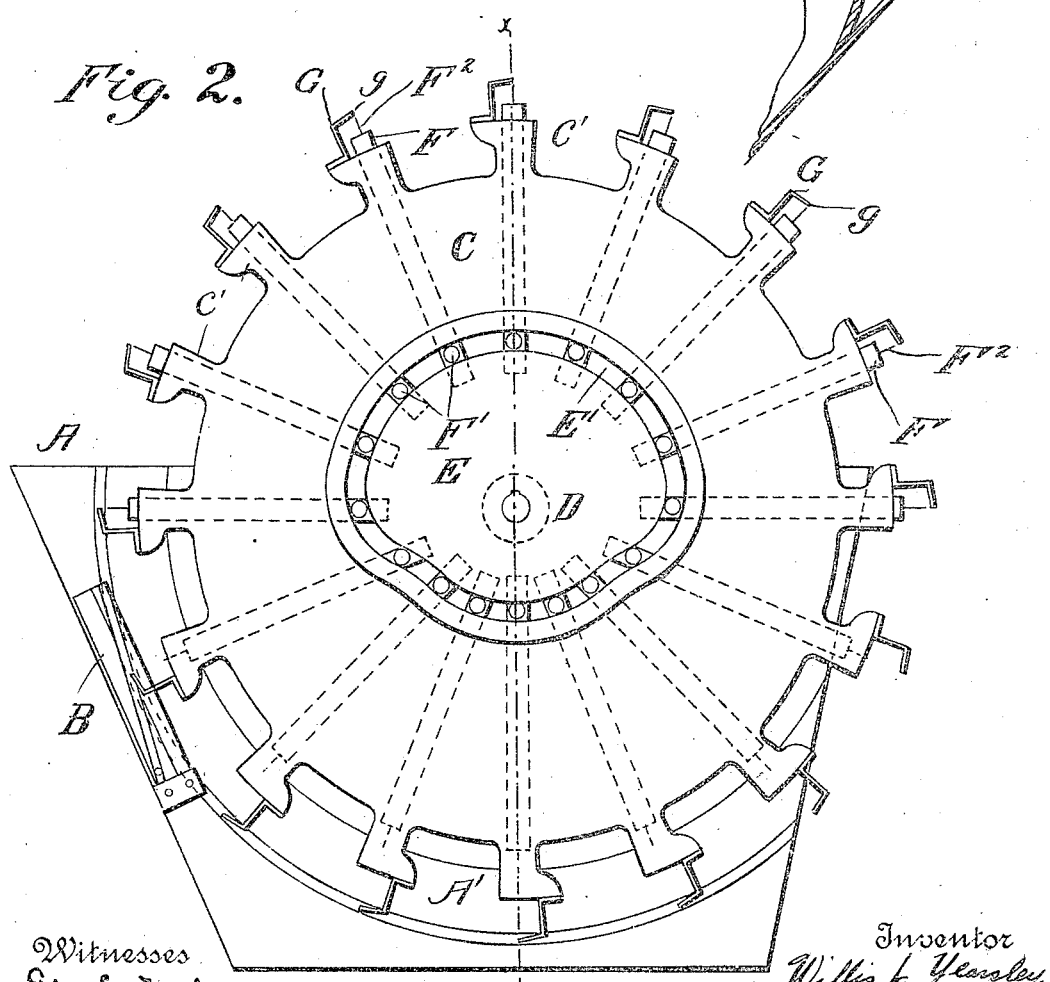

WILLIS J. YEARSLEY, OF WEST CHESTER, PENNSYLVANIA.

POTATO-PLANTER.

957,293.  Specification of Letters Patent.  Patented May 10, 1910.

Application filed May 29, 1909. Serial No. 499,158.

*To all whom it may concern:*

Be it known that I, WILLIS J. YEARSLEY, a citizen of the United States, residing at West Chester, in the county of Chester and State of Pennsylvania, have invented certain new and useful Improvements in Potato-Planters, of which the following is a specification.

My invention relates to potato planters and more particularly to that class employing revoluble pick up and discharge mechanism for the seed potato.

In this class of potato planters revoluble arms are employed to pick up and discharge the seed at given intervals, a fixed cam being employed to operate the arms or the pickers therein to pick up and discharge the seed potato. Heretofore, difficulty has been found to insure a positive pickup of the seed potato and also its prompt and regular discharge at equal intervals.

Now, it is the object of my invention to remedy these objections and provide means for holding and presenting separately to each picker arm as it rotates a piece of seed potato and thereby insure the piercing of the seed and its positive lodgment on the pickers.

It is equally my object to insure a prompt and positive discharge of each seed potato by means which will effect a sudden withdrawal of the pickers from the seed at a given point in the revolution of the arms and insure the deposit of the potato seed at equal distances apart in the furrow.

In the accompanying drawings forming a part of this specification: Figure 1 is a side elevation of a portion of a potato planter having my invention applied, the position of the seed retainer and the relative position of the pickers being shown in dotted lines. Fig. 2 is a detail side elevation of the wheel carrying the picker arms and the seed hopper, the latter having one side removed to disclose the position therein of the seed holder, the operative position of the picker arms and seed shields. Fig. 3 is a central vertical section of said wheel taken on line X. X. of Fig. 2, the bottom of the hopper being also shown in outline. Fig. 4 is a diagrammatic view in side elevation showing the potato seed retainer or holder detached and the operative position of a picker arm in the act of picking up the seed potato and the shield forcing the seed potato through the spring jaws until it reaches the position where the picker pierces the same. Fig. 5 is a top plan view of the seed retainer or holder and Fig. 6 is a front end view of said holder.

Referring more particularly to the drawings: A denotes the hopper; $A^1$ a channel in the bottom of the hopper arranged in alinement with the picker arms and having inclined sides and a groove, $A^2$, in its bottom, as shown in Fig. 3, arranged in alinement with the projecting ends of the seed shields hereinafter described.

B denotes a seed retainer or holder fastened in said recess or channel $A^1$ as shown in Figs. 1 and 2. Said holder is composed of two jaws $B^1$ $B^1$ pivotally mounted on bed block $B^3$ by pivot bolts $B^2$ passing through metal sleeves in the block and jaws and held in place by nuts. Said block has a central longitudinal groove $B^4$ arranged in alinement with and adapted to receive the projecting ends of said shields; said groove being arc shaped as shown in dotted lines in Fig. 4. The jaws $B^1$ $B^1$ are spaced apart on opposite sides of the groove $B^4$, the space between said blocks being greater at the front end of the said holder or the point of entrance of said shields into said holder between the jaws $B^1$ $B^1$.

$B^5$ denotes a yoke adapted to be fastened in the groove $A^2$, it supports the front end of the bed block and is provided with bolts $B^6$ $B^6$ passing through the arms of the yoke and rigidly fastened thereto by nuts, the inner ends of said bolts being fastened to the sides of said jaws.

$B^7$ $B^7$ denote flat springs bolted to opposite sides of the bed block and to the outer sides of the jaws $B^1$ $B^1$ as shown in Figs. 4, 5 and 6.

$B^8$ $B^8$ denote screw bolts loosely mounted on springs $B^7$ $B^7$ fastened to each side of the bed block, and provided with coiled tension springs $B^9$ $B^9$ and adjusting nuts to reinforce and regulate the tension of springs $B^7$ $B^7$. By this construction the jaws $B^1$ $B^1$ are loose upon the bed block yet are held wide apart at their front ends by the bolts $B^6$ $B^6$ while their rear or free ends are yieldingly held nearer together by said springs $B^7$ $B^7$. The bed block is held in position by braces $B^{10}$ fastened to each corner thereof and to the bottom of hopper A.

C denotes the wheel carrying the pickup and discharge picker arms. Said wheel is keyed on a shaft D and operated by a sprocket chain and sprocket wheels driven by the drive-wheel of the planter in the usual manner.

$C^1$ denotes lugs radiating from wheel C through which pickers or spears $F^2$ play.

E denotes a fixed cam mounted loosely on shaft D and rigidly secured to an adjoining part of the hopper not shown. $E^1$ denotes a raceway in said cam which is concentric with said shaft above its horizontal diameter while below such diameter said raceway is eccentric to said shaft, said eccentric portion of the raceway containing two short curves opposed one to the other on opposite sides of the vertical diameter of the wheel C.

F denotes a series of reciprocatory arms mounted radially in guide ways formed in wheel C and lugs $C^1$. The inner ends of said arms are provided with bearings $F^1$ loosely mounted in said raceway and their outer ends are provided with spears or pickers $F^2$.

G denotes seed shields bolted to lugs $C^1$ in rear of the guideway exits through which said pickers project. Said shields project radially from the wheel C and are provided with a downwardly and forwardly projecting nose $g$ the end of which extends to a point opposite to and below the range of stroke of the spears $F^2$.

The operation is as follows: The hopper being filled with seed potatoes which feed down into channel $A^1$, and wheel C put in motion, it will revolve in the direction shown by the arrow in Fig. 1. The shields as they pass into channel $A^1$ continually press the seed toward the retainer B and onward between the jaws $B^1$ $B^1$ until a seed or one piece of potato reaches the point where the jaws converge sufficiently to press upon each side of such seed; the shields continuing to press the seed push it upward between the yielding jaws $B^1$ $B^1$ until it reaches the position where the picker opposite will suddenly impale it. Thus, the seed is held firmly on each side by the jaws $B^1$ $B^1$ and below by the advancing shield while being impaled by the picker. Should more than one piece of seed become lodged between said jaws, it will be forced through them and fall back into the hopper. As the shields pass through the retainer between the jaws their noses $g$ pass below in the groove $B^4$ under the potato seed. Thus the noses of the shields emerge from the retainer under the potato seed and prevent the same from being dislodged from the pickers during the movement of the wheel C until the pickers are withdrawn. The potato seeds are carried over the wheel and the pickers are suddenly withdrawn at a given point in front of the hopper where the fall of the seed is guided by said shields into the usual trough, not shown, for conducting the seed to the furrows. The rapid reciprocatory movement given the arms F by the raceway occurs as the bearings $F^1$ reach the short curves and said curves are especially designed to afford this quick movement of said arms as the pickers pierce the seed and also as the pickers are withdrawn from the seed. The sudden withdrawal of the pickers is especially important as it effects an instantaneous discharge of the seed at a given point and then insures the deposit of the seed at equal distances apart in the furrow.

Having thus described my invention, what I claim and desire to secure by Letters Patnet is:—

1. A potato planter having in combination a rotatable wheel, reciprocatory arms radially disposed on said wheel mounted in guideways thereon carrying spears at one end, their opposite ends having bearings, fixed runway for said bearings, concentric with said wheel above its horizontal diameter and eccentric to said wheel below said diameter, the eccentric portion of said runway containing opposing short curves, shields radially disposed on said wheel adjacent to said spears, a potato hopper, a potato seed holder secured inside of said hopper having flexible or expansible side and a passage way running lengthwise thereof tangential to the arc described by said shields and adapted to admit the projecting ends of said shields to pass between and under said expansible sides.

2. In a potato planter of the class described, the combination with the rotary pick up and discharge mechanism for the seed, of a hopper, a revoluble wheel, shields projecting from the periphery of said wheel, a flexible potato holder fixed to said hopper in the path of said shields and provided with a longitudinal passageway in alinement with and adapted to receive the projecting portion of said shields, and reciprocatory pickers fended by said shields, whereby the shields force the seed through said passageway until pierced by the pickers and subsequently hold the seed on the pickers until they are withdrawn.

3. In a potato planter a seed picking and feeding device comprising a revoluble wheel, reciprocatory arms radially mounted on said wheel having spears at one end, means for actuating said arms, means for fending the seed and forcing it on said spears, and a potato seed holder secured inside the hopper having flexible sides adapted to hold the seed potato in position to be pierced, said holder consisting of pivoted jaws having a space between them arranged tangential to said spears and said jaws adapted to yieldingly hold the seed potato between them.

4. In a potato planter, a seed feeding device comprising a revoluble wheel, a series of shields projecting from the periphery of said wheel, reciprocatory arms mounted radially on said wheel having spears at one end arranged opposite the projecting ends of said shields, means for holding and presenting the potato seed to said spears, runways arranged concentric to said wheel above its horizontal diameter and also eccentric below said diameter said eccentric portion of the runway having opposing sharp curves on opposite sides of the vertical diameter of the wheel, and bearings for said reciprocatory arms mounted in said runway.

5. In a potato planter of the class described employing a hopper, a revoluble wheel, picker arms mounted on said wheel, spears or pickers for said arms, and means for operating said arms, the combination of a potato seed holder fastened inside the hopper comprising a pair of pivoted jaws spaced apart in said hopper to form a passage way for the potato seed between them and also form an entrance for said spears and means attached to said wheel for traversing said seed therethrough.

In testimony whereof I affix my signature in presence of two witnesses.

WILLIS J. YEARSLEY.

Witnesses:
MAURICE S. YEARSLEY,
LYDIA R. PARKER.